L. H. WILKINSON & W. G. BARKER.
ELECTRICALLY HEATED UTENSIL.
APPLICATION FILED DEC. 11, 1916.
1,227,721.
Patented May 29, 1917.
2 SHEETS—SHEET 1.
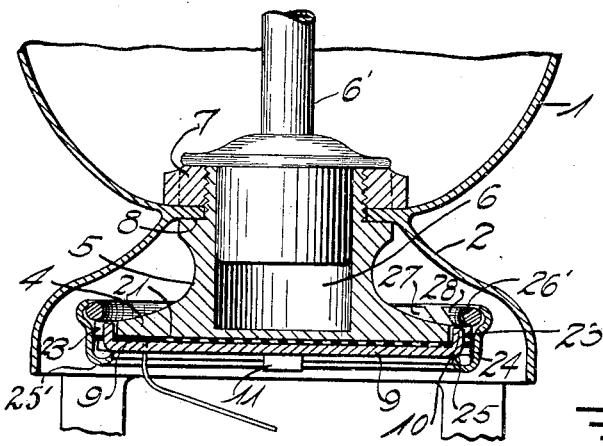
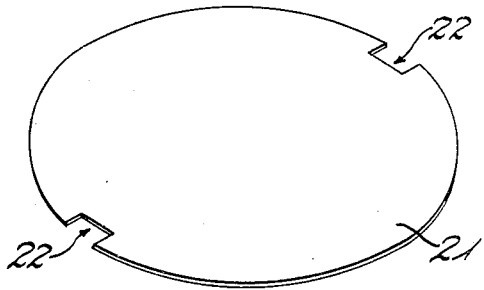
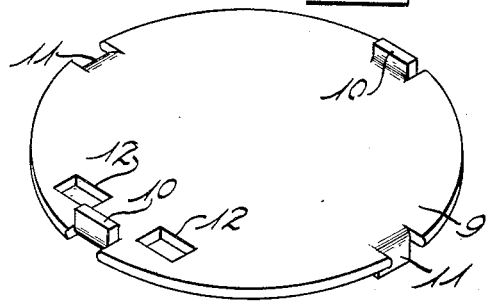
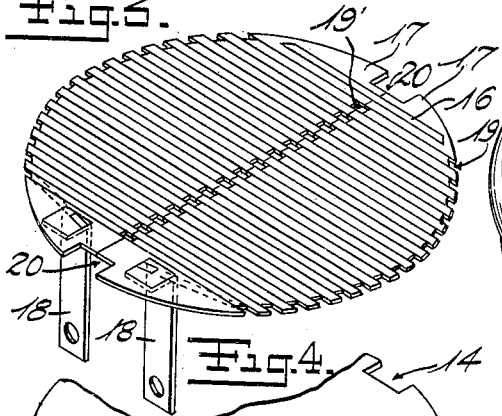
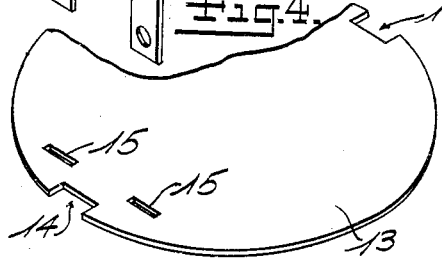
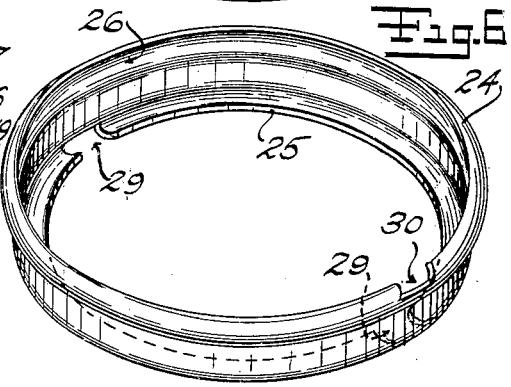
Inventors
L. H. WILKINSON.
W. G. BARKER.
By their Attorneys

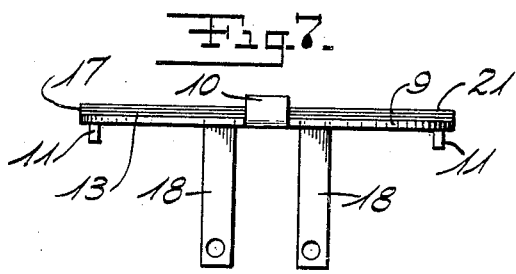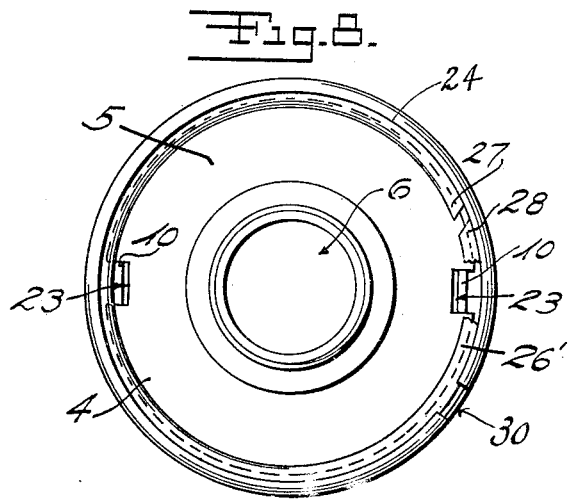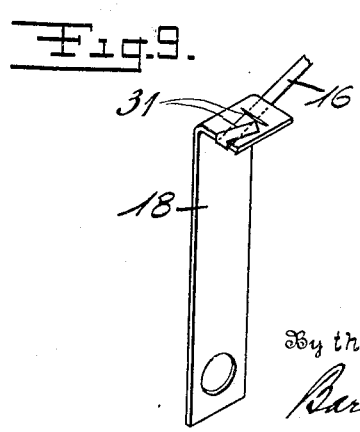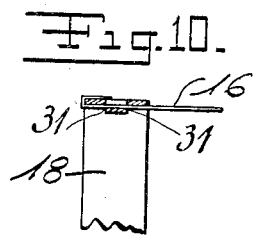

UNITED STATES PATENT OFFICE.

LOUIS H. WILKINSON AND WALTER G. BARKER, OF MERIDEN, CONNECTICUT, ASSIGNORS TO MANNING, BOWMAN & COMPANY, OF MERIDEN, CONNECTICUT, A CORPORATION OF CONNECTICUT.

ELECTRICALLY-HEATED UTENSIL.

1,227,721. Specification of Letters Patent. Patented May 29, 1917.

Application filed December 11, 1916. Serial No. 136,162.

*To all whom it may concern:*

Be it known that we, LOUIS H. WILKINSON and WALTER G. BARKER, citizens of the United States, residing at Meriden, in the county of New Haven, State of Connecticut, have invented certain new and useful Improvements in Electrically-Heated Utensils, of which the following is a full, clear, and exact description.

Our invention relates to improvements in electrically heated utensils, and has for its object to provide a utensil having an electrically heated unit affixed thereto by a spring and covered by a depending skirt, so as to be concealed from view, and removable from the part to which it is attached only after disassembling the parts constituting the utensil. It further has for its object to provide a utensil in which a heating unit is held to the surface to be heated by a spring, which is kept under tension and always tends to draw the unit closer to the surface to which it is applied. It further has for its object to provide means whereby the heating unit assists in assembling and disassembling the parts of the utensil.

It further has for its object to provide a device which is not likely to be tampered with so as to be injured.

The following is a description of an embodiment of our invention, reference being had to the accompanying drawings, in which:

Figure 1 shows the bottom portion of an electrically heated percolator;

Figs. 2, 3, 4 and 5 show in perspective the elements going to make up the heating unit,—Fig. 2 being an insulating disk, Fig. 3 being the resistance element supported on suitable bases, Fig. 4 a second insulating disk, and Fig. 5 the supporting plate of the heating unit;

Fig. 6 shows the ring used in securing the unit to the surface to be heated;

Fig. 7 shows a side elevation of the heating unit looking from the right of Fig. 1;

Fig. 8 is a plan view of the heat receiving elements and parts depending therefrom;

Figs. 9 and 10 are perspective and sectional views of a detail.

Referring more particularly to the drawings, Fig. 1 shows the lower portion of a utensil consisting of a percolator pot portion 1, a skirt 2 and a heat receiving and transmitting member. This heat receiving and transmitting member has a disk 4, with an upwardly extending central portion 5, containing a vaporizing chamber 6, and secured to the pot portion 1 and skirt 2 by a nut 7, screwed on the upper end of said upwardly projecting portion and clamping an inwardly projecting flange 8, located between the pot portion and skirt. 6' is the ordinary percolator tube with its enlarged base fitted into the vaporizing chamber. Secured to the heat receiving and transmitting member is a heating unit, shown in Fig. 7, and composed of a metallic plate 9, having two upwardly projecting extensions 10, and two downwardly extending projections 11, and also having two holes 12 through which terminals of the resistance conductor or heating coil pass. 13 is a disk of mica having notches 14 for engaging the upwardly projecting extensions 10 of the plate 9, and having narrow holes 15 adapted to register with the centers of the holes 12 in the plate 9, and to permit the passage of the terminals of the resistance coil. 16 is a resistance coil, preferably of flat wire or strip, wound upon semi-circular pieces of mica 17, and provided with terminals 18 which pass through the holes 15 and 12 and the disks 13 and 9. The semi-circular portions 13 have in their edges notches 19, to receive the ends of the resistance conductor, and at diametrically opposite points have complementary cutaway portions producing notches 20, through which the upwardly turned extensions 10 pass. On top of the resistance coil is a disk of mica 21, having notches 22, which also receive the upwardly turned extensions 10. By reason of the notches 14, 20 and 22 engaging the upwardly turned extensions 10, the elements of the heater unit are caused to register correctly, so that the terminals 18 are held in a definite position in the holes 12, so as to be out of electrical contact with the metal disk 9. Located in the periphery of the disk 4 are notches 23, into which the upper ends of the projections 10 also extend, with the result that the plate 9 of the heater unit, together with the other elements 13, 17 and 21, are all held fixed relatively to the disk 4.

In order to hold the heating unit to the disk 4, we provide a clamp ring 24, having an in-turned lower edge 25, and open at its upper end so as to freely admit the disk 4 of the heat receiving element. This upper end is provided with an internal circumferentially extending recess 26, and in this recess is an expanding spring ring 26',—this spring ring having its free opposing ends 27—28 preferably in quite close proximity to one another. The spring ring 26' and recess 26 are so proportioned relatively to the thickness of the heater unit, and the edge of the disk 4, that when the spring ring 26' is in place, it does not seat laterally in the bottom of the recess 26, but is held out of contact therewith, so that the spring action of the spring ring 26' always tends to draw the heater unit into closer proximity with the bottom of the disk 4. The clamp ring 24 is provided with two diametrically opposite notches 29, which engage the downward projections 11 of the plate 9, with the result that the clamp ring 24 is held by these projections and notches from turning relatively to the plate 9 and disk 4, thus preventing anyone from turning said clamp ring 24, if they should attempt to do so, under the impression that the clamp ring could be unscrewed. The clamp ring 24 is also provided with a notch 30, through which the expansion spring ring 26' can be reached by a screwdriver, or similar tool, for the purpose of lifting the spring ring 26' out of the recess 26, for the purpose of disassembling the unit from disk 4 of the heat receiving member. The projections 11 extend sufficiently below the clamp ring 24 so that a wrench or other holding device, may be applied thereto, for the purpose of holding the disk 9, and through it the heat receiving member from revolution, while a suitable spanner or other tool is applied to the nut 7, for the purpose of screwing the same on or off in attaching the heat receiving member to the pot portion, or removing it therefrom.

The inturned edge 25 is curved at 25' so that its innermost portion provides a bearing surface, engaging the bottom of the disk 9 at points considerably removed from its periphery and the clamping ring does not touch the lower surface of the disk outside of said points. Such engagement of the edge 25 with the disk 9 tends to prevent the disk or bottom plate 9 of the unit from bulging as it expands and contracts.

The terminals 18 are in the construction shown of greater dimensions than the resistance coils 16, and are made of German silver or other material of relatively low resistance. They are provided with two slits 31, through which the end of the resistance coil is passed, and then bent over so as to form a secure connection without the use of rivets or solder. The metal between the slits is preferably bent down, as in Fig. 10, before the insertion of the end of the resistance coil, and then flattened out, as in Fig. 9, so as to be in substantially the same plane as the adjoining portions, and firmly clamp the inserted end portion.

From the foregoing description it will be seen that the heating unit is drawn into intimate relation with the bottom of the disk 4 of the heat receiving member, by reason of the action of the spring 26', and that that spring 26' always tends to draw the heating unit into closer and closer contact with such disk. It will also be seen that the heating unit has to be applied to the heat receiving member before the parts constituting the utensil are assembled, and cannot be removed from the heat receiving member until the parts are disassembled by the removing of the nut 7, thus making it impossible for any unskilled person to interfere with the proper relations of a perfect unit, or to attempt to repair a unit which may have been injured, and practically insuring that all attempts at repairs of the heating unit will be made by skilled workmen, but that the construction is such that the repairs can be easily made by a skilled workman, who knows how to properly assemble and disassemble parts constituting the utensil proper.

As will be evident to those skilled in the art, our invention permits of various modifications, without departing from the spirit thereof, or the scope of the appended claims.

What we claim is:

1. In an electrically heated utensil, the combination of a container, a heating unit and spring means holding said heating unit in contact with the bottom of said container, said spring means consisting of a clamp ring, having at one edge a bearing surface, and at the other an internal undercut recess, and an expanding spring ring within said undercut recess.

2. In an electrically heated utensil, the combination of a container, a heating unit and spring means holding said heating unit in contact with the bottom of said container, said spring means consisting of a clamp ring, having at one edge a bearing surface, and at the other an undercut recess, and an expanding spring ring within said undercut recess, the edge of said clamp ring holding said expanding spring ring from making peripheral contact with the bottom of said recess in said clamp ring.

3. In an electrically heated utensil a combination of a container having a flanged bottom, provided with peripheral notches; a heating unit having a metallic base plate provided with upward extensions entering said notches, and holes for the passage of the resistance terminals of said heater unit, and means for holding said heating unit to said flanged bottom.

4. In an electrically heated utensil, a combination of a container having a removable flanged bottom, and a nut securing said flanged bottom in place, said flanged bottom being provided with peripheral notches; a heating unit, having a metallic base plate, provided with upward extensions entering said notches and having downward projections, and means for holding said unit to said flanged bottom.

5. In an electrically heated utensil, a combination of a container having a removable flanged bottom, and a nut securing said flanged bottom in place, said flanged bottom being provided with peripheral notches; a heating unit, having a metallic base plate, provided with upward extensions entering said notches and having downward projections, and means for holding said unit to said flanged bottom, said means having notches engaged by said downward projections.

6. In an electrically heated utensil, the combination of a container, a heating unit and spring means holding said heating unit in contact with the bottom of said container, said spring means consisting of a clamp ring, having at one edge a bearing surface, and at the other an internal undercut recess, and an expanding spring ring within said undercut recess, said heating unit having a metallic bottom plate and said bearing surface engaging the bottom surface of said bottom plate only at points removed from the periphery of said bottom plate.

LOUIS H. WILKINSON.
WALTER G. BARKER.

Copies of this patent may be obtained for five cents each, by addressing the "Commissioner of Patents, Washington, D. C."